US012711736B2

(12) United States Patent
Zhu et al.

(10) Patent No.: US 12,711,736 B2
(45) Date of Patent: Aug. 18, 2026

(54) FACE IMAGE CLUSTERING METHOD AND SYSTEM BASED ON LOCALIZED SIMPLE MULTIPLE KERNEL K-MEANS

(71) Applicant: ZHEJIANG NORMAL UNIVERSITY, Jinhua (CN)

(72) Inventors: Xinzhong Zhu, Jinhua (CN); Huiying Xu, Jinhua (CN); Miaomiao Li, Jinhua (CN); Yi Zhang, Jinhua (CN); Jianping Yin, Jinhua (CN); Xiao Huang, Jinhua (CN); Yunliang Jiang, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 256 days.

(21) Appl. No.: 18/681,863

(22) PCT Filed: Aug. 12, 2022

(86) PCT No.: PCT/CN2022/112016
§ 371 (c)(1),
(2) Date: Feb. 7, 2024

(87) PCT Pub. No.: WO2023/020373
PCT Pub. Date: Feb. 23, 2023

(65) Prior Publication Data

US 2024/0331351 A1 Oct. 3, 2024

(30) Foreign Application Priority Data

Aug. 17, 2021 (CN) ......................... 202110940777.6

(51) Int. Cl.

*G06V 10/762* (2022.01)
*G06F 18/23213* (2023.01)
*G06N 20/00* (2019.01)

(52) U.S. Cl.
CPC ................................. *G06V 10/762* (2022.01)

(58) Field of Classification Search
USPC ......................................................... 382/225
See application file for complete search history.

(56) References Cited

U.S. PATENT DOCUMENTS

2015/0058982 A1* 2/2015 Eskin ..................... G06F 16/84 726/23
2018/0307901 A1 10/2018 Chen et al.
(Continued)

FOREIGN PATENT DOCUMENTS

CN 113762354 A 12/2021

OTHER PUBLICATIONS

Gönen, Mehmet, and Ethem Alpaydin. "Localized multiple kernel learning." Proceedings of the 25th international conference on Machine learning. (Year: 2008).*
(Continued)

*Primary Examiner* — Chineyere Wills-Burns
*Assistant Examiner* — Bezawit Nolawi Shimeles
(74) *Attorney, Agent, or Firm* — Bayramoglu Law Offices LLC

(57) ABSTRACT

A face image clustering method and system based on a localized simple multiple kernel k-means is provided. The face image clustering method based on localized simple multiple kernel k-means includes the following steps: S1, acquiring face images, and preprocessing the acquired face images to obtain an average kernel matrix for each view; S2, calculating n (τ×n)-nearest neighbor matrices according to the obtained average kernel matrices; S3, calculating a localized kernel matrix for each view according to the nearest neighbor matrices; S4, constructing a localized simple multiple kernel k-means clustering objective function according to the calculated localized kernel matrix for each view; S5, solving a minimum of the constructed objective function by adopting a reduced gradient descent
(Continued)

method to obtain an optimal clustering partition matrix; and S6, performing k-means clustering on the obtained clustering partition matrix to achieve clustering.

6 Claims, 7 Drawing Sheets

(56) References Cited

U.S. PATENT DOCUMENTS

| | | | | |
|---|---|---|---|---|
| 2019/0325198 | A1* | 10/2019 | Friedland | G08B 13/196 |
| 2020/0034739 | A1* | 1/2020 | Chung | G06N 3/0464 |
| 2020/0302265 | A1* | 9/2020 | Wang | G06V 10/454 |
| 2021/0012093 | A1* | 1/2021 | Rao | G06T 5/70 |

OTHER PUBLICATIONS

Xinwang Liu, et al., SimpleMKKM: Simple Multiple Kernel K-means, 2020.

Ren Shijin, et al., Kernel-Induced Space Selection Approach to LPKHDA Dimensional Reduction Algorithm, Journal of Frontiers of Computer Science and Technology, 2013, pp. 272-281, vol. 7, No. 3.

Mu Xinliang, A Fast KPCA Face Recognition Algorithm Based on Mixed Kernel Function, Electronic Sci, &Tech., 2015, pp. 46-50, vol. 28, Issue 2.

Luefeng Chen, et al., K-Means Clustering-based Kernel Canonical Correlation Analysis for Multimodal Emotion Recognition, Preprints of the 21st IFAC World Congress (Virtual), 2020, p. 10385-10389.

* cited by examiner

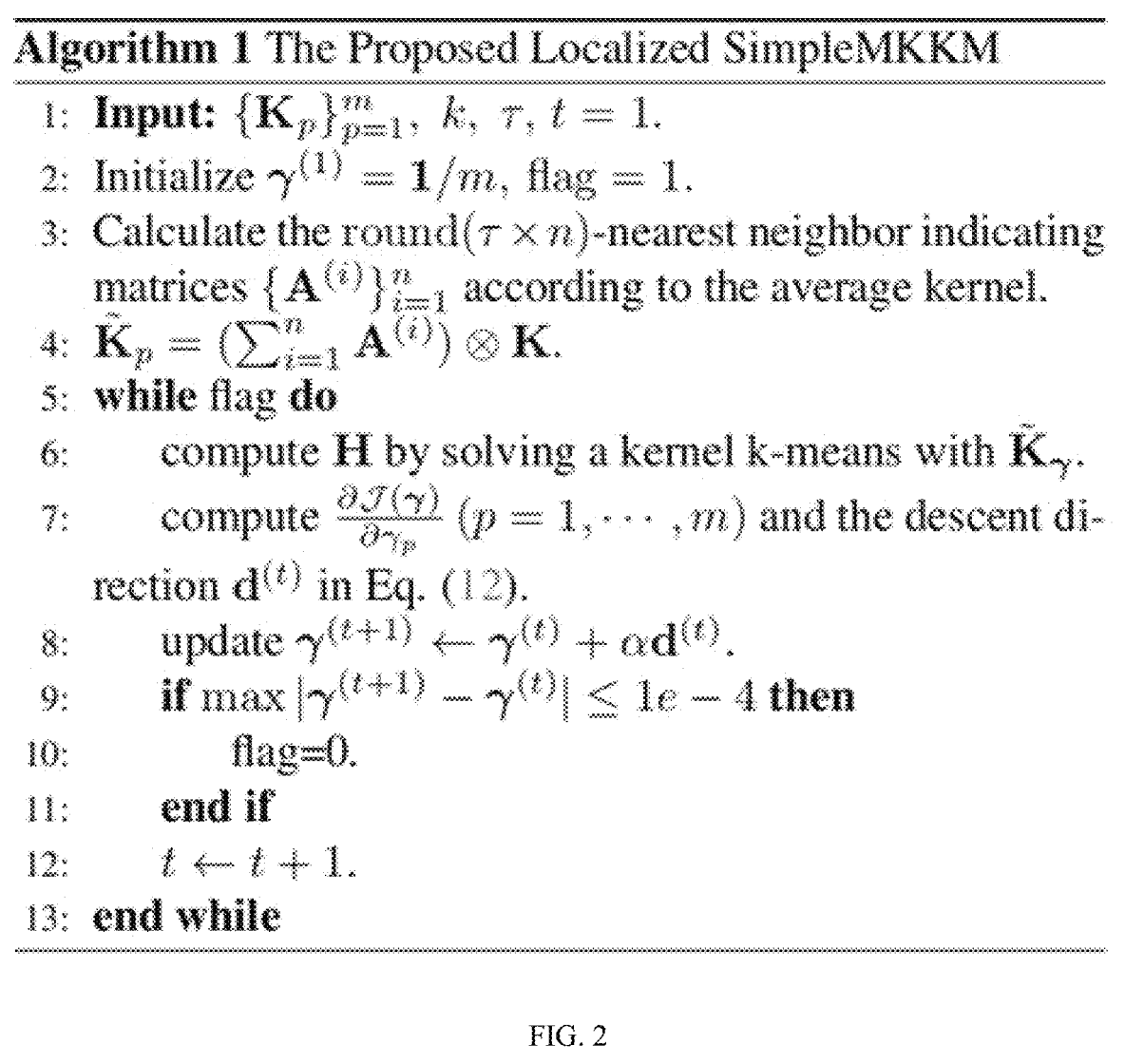

Algorithm 1 The Proposed Localized SimpleMKKM

1: Input: $\{\mathbf{K}_p\}_{p=1}^m$, $k$, $\tau$, $t=1$.
2: Initialize $\boldsymbol{\gamma}^{(1)} = \mathbf{1}/m$, flag $= 1$.
3: Calculate the round$(\tau \times n)$-nearest neighbor indicating matrices $\{\mathbf{A}^{(i)}\}_{i=1}^n$ according to the average kernel.
4: $\tilde{\mathbf{K}}_p = (\sum_{i=1}^n \mathbf{A}^{(i)}) \otimes \mathbf{K}$.
5: while flag do
6: compute $\mathbf{H}$ by solving a kernel k-means with $\tilde{\mathbf{K}}_{\boldsymbol{\gamma}}$.
7: compute $\frac{\partial \mathcal{J}(\boldsymbol{\gamma})}{\partial \gamma_p}$ $(p = 1, \cdots, m)$ and the descent direction $\mathbf{d}^{(t)}$ in Eq. (12).
8: update $\boldsymbol{\gamma}^{(t+1)} \leftarrow \boldsymbol{\gamma}^{(t)} + \alpha \mathbf{d}^{(t)}$.
9: if max $|\boldsymbol{\gamma}^{(t+1)} - \boldsymbol{\gamma}^{(t)}| \leq 1e-4$ then
10: flag=0.
11: end if
12: $t \leftarrow t+1$.
13: end while

FIG. 2

FACE IMAGE CLUSTERING METHOD AND SYSTEM BASED ON LOCALIZED SIMPLE MULTIPLE KERNEL K-MEANS

CROSS REFERENCE TO THE RELATED APPLICATIONS

This application is the national phase entry of International Application No. PCT/CN2022/112016, filed on Aug. 12, 2022, which is based upon and claims priority to Chinese Patent Application No. 202110940777.6, filed on Aug. 17, 2021, the entire contents of which are incorporated herein by reference.

TECHNICAL FIELD

The present application relates to the technical field of machine learning of face image processing, in particular to a face image clustering method and system based on a localized simple multiple kernel k-means.

BACKGROUND

With the widespread application of the face recognition and retrieval system, the face image data in the system has increased sharply, and the face clustering technology has become an important foundation for improving the retrieval efficiency of the system. In face clustering, the face image information in the database is usually clustered into different subclasses, so that the similarity between the subclasses is as small as possible, and the similarity in the subclasses is as large as possible. In this way, during retrieval, only the subclasses with high similarity to the target to be retrieved need to be identified one by one, thus retrieving records with the highest similarity to the target to be retrieved.

K-means clustering is the most widely used method, and kernel k-means clustering is widely studied because it can learn the nonlinear information of samples. Multiple kernel clustering provides an elegant framework for grouping samples into different categories by extracting complementary information from multiple sources. Through highly efficient and high-quality clustering, the efficiency of data analysis is greatly enhanced and labor costs are saved. By fully considering the relationships between samples, a local kernel alignment variable has been developed. Experiments have proven that this can improve clustering performance. By assuming that an optimal kernel is located in the neighborhood of a combined kernel, an optimal neighborhood multiple kernel clustering algorithm has been provided that improves clustering performance by improving the representability of learned optimal kernels. The algorithm maximally aligns multiple base partitions with consistent partitions, with considerable algorithm acceleration and satisfactory clustering performance. On this basis, an effective algorithm based on late-fusion for processing incomplete multi-view data has been provided.

As a representative of multi-view clustering, a new simple multiple kernel k-means (SimpleMKKM) has recently been provided. SimpleMKKM does not jointly minimize the kernel weight and the clustering partition matrix, but minimizes the kernel weight and maximizes the clustering partition matrix optimization framework, resulting in a troublesome minimum-maximum optimization. It can then be equivalently converted into a minimization problem, and a reduced gradient algorithm is designed to solve the resulting optimization. This algorithm has proven to be an efficient optimization with robustness to noise perspectives and has attracted a wide range of attention from many researchers.

Although the recently provided SimpleMKKM has the above-mentioned advantages, it has been observed that it tightly aligns the combined kernel matrix with the "ideal" similarity globally generated by the clustering partition matrix. This can force all sample pairs to align equally with the same ideal similarity indiscriminately. Therefore, it cannot effectively handle the relationships between samples, neglects local structures, and possibly results in unsatisfactory clustering performance.

SUMMARY

The present application aims to address the defects of the prior art by providing a face image clustering method and system based on localized simple multiple kernel k-means.

In order to achieve the above objective, the present application adopts the following technical solutions:

Provided is a face image clustering method based on localized simple multiple kernel k-means, including the following steps:

- S1, acquiring face images, and preprocessing the acquired face images to obtain an average kernel matrix for each view;
- S2, calculating n (τ×n)-nearest neighbor matrices according to the obtained average kernel matrices;
- S3, calculating a localized kernel matrix for each view according to the nearest neighbor matrices;
- S4, constructing a localized simple multiple kernel k-means clustering objective function according to the calculated localized kernel matrix for each view;
- S5, solving a minimum of the constructed objective function by adopting a reduced gradient descent method to obtain an optimal clustering partition matrix; and
- S6, performing k-means clustering on the obtained clustering partition matrix to achieve clustering.

Further, calculating the localized kernel matrix for each view in S3 is expressed as:

$$\bar{K}_p = \left(\sum_{i=1}^{n} A^{(i)}\right) \otimes K_p$$

wherein $\bar{K}_p$ represents the localized kernel matrix of each view; $A^{(i)}$ represents the n (τ×n)-nearest neighbor matrices; $K_p$ represents the p-th given kernel matrix; n represents a number of samples; ⊗ represents the multiplication of elements.

Further, the simple multiple kernel k-means clustering objective function in S4 is expressed as:

$$\min_{\gamma\in\Delta} \max_{H\in\mathbb{R}^{n\times k}} Tr\left(K_\gamma H H^T\right)$$

$$\text{s.t.}$$

$$H^T H = I_k.$$

wherein γ represents a coefficient vector; H represents a partition matrix; $H^T$ represents a permutation of a commutation matrix; $K_\gamma$ represents a combined kernel matrix of $K_p$ generated by γ; $I_k$ represents a k-order identity matrix.

Further, the localized simple multiple kernel k-means clustering objective function in S4 is expressed as:

$$\min_{\gamma\in\Delta}\max_{H\in\mathbb{R}^{n\times k}} Tr\left(H^T\sum_{i=1}^n\left(A^{(i)}K_\gamma A^{(i)}\right)H\right)$$

$$\text{s.t.}$$

$$H^TH=I_k,$$

wherein $$\Delta=\left\{\gamma\in\mathbb{R}^m\middle|\sum_{p=1}^m\gamma_p=1,\ \gamma_p\geq 0,\ \forall\ p\right\},$$

$R^m$ represents an m-dimensional real number vector space; $\gamma_p$ represents the p-th component of $\gamma$.

Further, solving the minimum of the constructed objective function in S5 specifically includes: simplifying the localized simple multiple kernel k-means clustering objective function into a simple multiple kernel k-means clustering objective function:

$$\sum_{i=1}^n Tr\left(H^T\left(A^{(i)}K_\gamma A^{(i)}\right)H\right)=\sum_{i=1}^n\left\langle A^{(i)}\otimes K_\gamma,\ A^{(i)}\otimes\left(HH^T\right)\right\rangle_F=$$
$$\sum_{i=1}^n\left\langle A^{(i)}\otimes K_\gamma,\ HH^T\right\rangle_F=\left\langle\left(\sum_{i=1}^n A^{(i)}\right)\otimes K_\gamma,\ HH^T\right\rangle_F=$$
$$\sum_{p=1}^m\gamma_p^2\left\langle\left(\sum_{i=1}^n A^{(i)}\right)\otimes K_p,\ HH^T\right\rangle_F=\sum_{p=1}^m\gamma_p^2\left\langle\tilde{K}_p,\ HH^T\right\rangle_F=Tr\left(H^T\tilde{K}_\gamma H\right),$$

wherein $\otimes$ represents the multiplication of elements;

$$\tilde{K}_p=\left(\sum_{i=1}^n A^{(i)}\right)\otimes K_p$$

represents a standardized kernel matrix;

when all elements of $A^{(i)}$ are set to 1, the simple multiple kernel k-means clustering objective function is expressed as:

$$\min_{\gamma\in\Delta}\mathcal{J}(\gamma)$$

$$\text{wherein}$$

$$\mathcal{J}(\gamma)=\left\{\max_H Tr\left(H^T\tilde{K}_\gamma H\right),\ \text{s.t. } H^TH=I_k.\right\},$$

representing an optimum function.

Further, solving the minimum of the constructed objective function by adopting the reduced gradient descent method in S5 specifically includes:

calculating the objective function by the gradient descent method as:

$$[\nabla\mathcal{J}(\gamma)]_p=\frac{\partial\mathcal{J}(\gamma)}{\partial\gamma_p}-\frac{\partial\mathcal{J}(\gamma)}{\partial\gamma_u}\forall\ p\neq u$$

$$[\nabla\mathcal{J}(\gamma)]_p=\sum_{p=1,\,p\neq u}^m\left(\frac{\partial\mathcal{J}(\gamma)}{\partial\gamma_u}-\frac{\partial\mathcal{J}(\gamma)}{\partial\gamma_p}\right)$$

$$\text{wherein}$$

-continued $$\frac{\partial\mathcal{J}(\gamma)}{\partial\gamma_p}=2\gamma_p Tr\left(H^{*T}\tilde{K}_pH^*\right),$$

$$H^*=\left\{\arg\max_H Tr\left(H^T\tilde{K}_\gamma H\right)\ \text{s.t. } H^TH=I_k\right\};$$

u is set as a number indicating the largest component of vector $\gamma$, and a positive constraint of $\gamma$ is expressed as:

$$d_p=\begin{cases}0 & \text{if } \gamma_p=0 \text{ and } [\nabla\mathcal{J}(\gamma)]_p>0\\ -[\nabla\mathcal{J}(\gamma)]_p & \text{if } \gamma_p>0 \text{ and } p\neq u\\ -[\nabla\mathcal{J}(\gamma)]_u & \text{if } p=u\end{cases}.$$

wherein $d_p$ represents a descending direction.

Correspondingly, further provided is a face image clustering system based on localized simple multiple kernel k-means, including:

an acquisition module, configured for acquiring face images and preprocessing the acquired face images to obtain an average kernel matrix for each view;

a first calculation module, configured for calculating n ($\tau\times$n)-nearest neighbor matrices according to the obtained average kernel matrices;

a second calculation module, configured for calculating a localized kernel matrix for each view according to the nearest neighbor matrices;

a construction module, configured for constructing a localized simple multiple kernel k-means clustering objective function according to the calculated localized kernel matrix for each view;

a solving module, configured for solving a minimum of the constructed objective function by adopting a reduced gradient descent method to obtain an optimal clustering partition matrix; and a clustering module, configured for performing k-means clustering on the obtained clustering partition matrix to achieve clustering.

Further, calculating the localized kernel matrix for each view in the second calculation module is expressed as:

$$\bar{K}_p=\left(\sum_{i=1}^n A^{(i)}\right)\otimes K_p$$

wherein $\overline{K}_p$ represents the localized kernel matrix of each view; $A^{(i)}$ represents the n ($\tau\times$n)-nearest neighbor matrices; $K_p$ represents the p-th given kernel matrix; n represents a number of samples; $\otimes$ represents the multiplication of elements.

Further, the simple multiple kernel k-means clustering objective function in the construction module is expressed as:

$$\min_{\gamma\in\Delta}\max_{H\in\mathbb{R}^{n\times k}} Tr\left(K_\gamma HH^T\right)$$

$$\text{s.t.}$$

$$H^TH=I_k.$$

wherein $\gamma$ represents a coefficient vector; H represents a partition matrix; $H^T$ represents a permutation of a commutation matrix; $K_\gamma$ represents a combined kernel matrix of $K_p$ generated by $\gamma$; $I_k$ represents a k-order identity matrix.

Further, the localized simple multiple kernel k-means clustering objective function in the construction module is expressed as:

$$\min_{\gamma\in\Delta} \max_{H\in\mathbb{R}^{n\times k}} Tr\left(H^T \sum\nolimits_{i=1}^{n} \left(A^{(i)} K_\gamma A^{(i)}\right) H\right)$$

s.t.

$$H^T H = I_k,$$

wherein $$\Delta = \left\{\gamma \in \mathbb{R}^m \,\middle|\, \sum\nolimits_{p=1}^{m} \gamma_p = 1,\ \gamma_p \geq 0,\ \forall\ p\right\},$$

$R^m$ represents an m-dimensional real number vector space; $\gamma_p$ represents the p-th component of $\gamma$.

Compared with the prior art, the present application provides a novel localized simple multiple kernel k-means clustering machine learning method, which includes modules of localized kernel alignment, objective function optimization to obtain an optimal combination coefficient $\gamma$, a corresponding partition matrix H, and the like. In the present application, through the optimization of the objective function, the optimized kernel combination can represent the information of a single view, and can better serve the view fusion, so that the purpose of improving the clustering effect is achieved. Moreover, the present application performs localization processing on each view to strengthen local information. Multiple kernel k-means with min-max learning (MKKM-MM) was the first attempt to improve MKKM through min-max learning, which indeed improves MKKM, but has a limited effect. The performance of the provided localized SimpleMKKM significantly surpasses that of MKKM-MM. This once again proves the advantages of the formula and the associated optimization strategy of the present application. The localized SimpleMKKM consistently and significantly outperforms SimpleMKKM.

BRIEF DESCRIPTION OF THE DRAWINGS

FIG. 2 is a flowchart of an algorithm according to Embodiment I;

DETAILED DESCRIPTION OF THE EMBODIMENTS

The embodiments of the present application are illustrated below through specific examples, and other advantages and effects of the present application can be easily understood by those skilled in the art based on the contents disclosed herein. The present application can also be implemented or applied through other different specific embodiments. Various modifications or changes to the details in the description can be made based on different perspectives and applications without departing from the spirit of the present application. It should be noted that, unless conflicting, the embodiments and features of the embodiments below may be combined with each other.

The present application aims to address the defects of the prior art by providing a face image clustering method and system based on localized simple multiple kernel k-means.

Embodiment I

Figure 1:
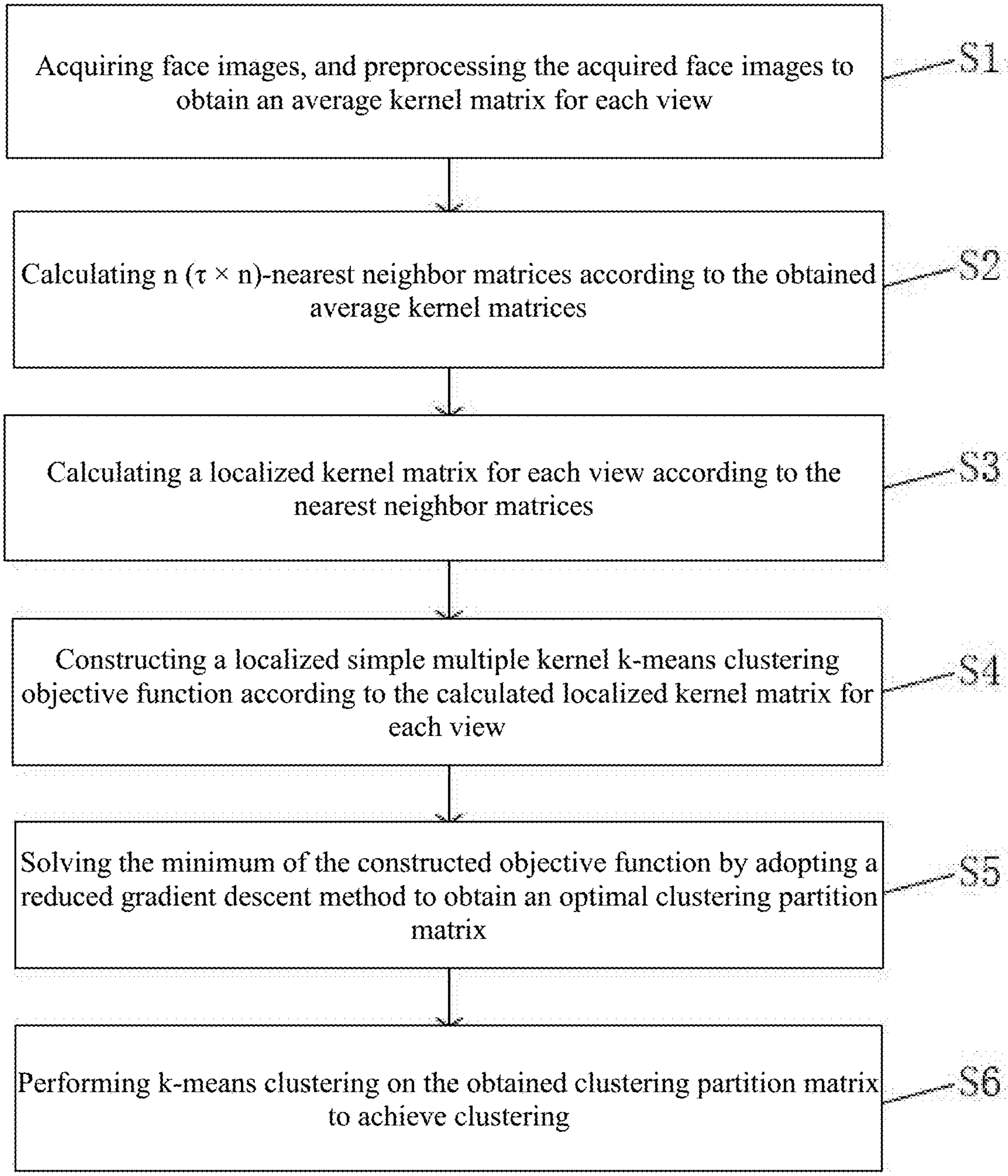
FIG. 1 is a flowchart of a face image clustering method based on localized simple multiple kernel k-means according to Embodiment I.

The embodiment provides a face image clustering method based on localized simple multiple kernel k-means, as shown in FIG. 1, including the following steps:

S1, acquiring face images, and preprocessing the acquired face images to obtain an average kernel matrix for each view;

S2, calculating n (TX n)-nearest neighbor matrices according to the obtained average kernel matrices;

S3, calculating a localized kernel matrix for each view according to the nearest neighbor matrices;

S4, constructing a localized simple multiple kernel k-means clustering objective function according to the calculated localized kernel matrix for each view;

S5, solving a minimum of the constructed objective function by adopting a reduced gradient descent method to obtain an optimal clustering partition matrix; and S6, performing k-means clustering on the obtained clustering partition matrix to achieve clustering.

The kernel k-means clustering process is as follows:

$$\{x_i\}_{i=1}^{n} \subseteq X$$

is set as a dataset consisting of n samples, and $\phi(\cdot):x \in \chi \rightarrow \mathcal{H}$ represents a feature mapping that projects sample x into a reproducing kernel Hilbert space $\mathcal{H}$. The target of kernel k-means clustering is to minimize the sum of squared errors based on the partition matrix $B \in \{0,1\}^{n\times k}$, as shown in the following formula:

$$\min_{Z\in\{0,1\}^{n\times k}} \sum_{i=1,c=1}^{n,k} B_{ic} \|\phi(x_i) - \mu_c\|_2^2$$

s.t.

$$\sum_{c=1}^{k} B_{ic} = 1,$$

wherein $$\mu_c = (1/n_c) \sum\nolimits_{i=1}^{n} B_{ic} \phi(x_i),$$

and $$n_c = \sum\nolimits_{i=1}^{n} B_{ic}$$

represents the number of samples belonging to the c-th cluster ($1 \le c \le k$). The above formula can be reformulated as:

$$\min_{Z \in \{0,1\}^{n \times k}} Tr(K) - Tr\left(L^{\frac{1}{2}} B^T K B L^{\frac{1}{2}}\right)$$

$$\text{s.t.}$$

$$B 1_k = 1_n,$$

wherein K is a kernel matrix with elements $$K_{ij} = \phi(x_i)^T \phi(x_j),\ L = \mathrm{diag}\left(\left[n_1^{-1}, \ldots, n_k^{-1}\right]\right),$$

and $1_s \in \mathbb{R}^s$ represents a vector in which all elements are 1.

Since variable B in the above formula is discrete, optimization is difficult, $$H = BL^{\frac{1}{2}}$$

is set, and the discrete constraint is converted into a real-value orthogonal constraint, i.e., $H^T H = I_k$. The target formula may be converted into:

$$\min_{H^T H = I_k} Tr\left(K\left(I_n - HH^T\right)\right),$$

the closed-form solution thereof is given by the eigenvectors corresponding to the k maximum eigenvalues of the kernel matrix $K_p$ which can be obtained by eigendecomposition of K.

In S3, the localized kernel matrix for each view is calculated according to the nearest neighbor matrices.

The localized kernel matrix for each view is expressed as:

$$\bar{K}_p = \left(\sum_{i=1}^{n} A^{(i)}\right) \otimes K_p$$

wherein $\overline{K}_p$ represents the localized kernel matrix of each view; $A^{(i)}$ represents the n ($\tau \times n$)-nearest neighbor matrices; $K_p$ represents the p-th given kernel matrix; n represents a number of samples; $\otimes$ represents the multiplication of elements.

In S4, the localized simple multiple kernel k-means clustering objective function is constructed according to the calculated localized kernel matrix for each view.

The simple multiple kernel k-means clustering objective function is expressed as:

$$\min_{\gamma \in \Delta} \max_{H \in \mathbb{R}^{n \times k}} Tr\left(K_\gamma HH^T\right)$$

$$\text{s.t.}$$

$$H^T H = I_k.$$

wherein $\gamma$ represents a coefficient vector; H represents a partition matrix; $H^T$ represents a permutation of a commutation matrix; $K_\gamma$ represents a combined kernel matrix of $K_p$ generated by $\gamma$; $I_k$ represents a k-order identity matrix.

$S^{(i)} \in \{0, 1\}^{n \times round(\tau \times n)}$ represents the ($\tau \times n$)-nearest neighbor indicator matrix of the i-th sample, and round($\cdot$) represents a rounding function. The embodiment defines the local alignment of the i-th sample, which is expressed as:

$$\left\langle S^{(i)^T} K_\gamma S^{(i)},\ S^{(i)^T} H^T H S^{(i)} \right\rangle_F$$

wherein $S^{(i)^T} K_\gamma S^{(i)}$ represents that the nearest neighbor element of the i-th sample is taken. This local alignment only requires more reliable samples to be kept together, which enables it to better use the variations between kernel matrices for clustering. Local alignment of each sample is achieved by connecting pairs.

The localized simple multiple kernel k-means clustering objective function is expressed as:

$$\min_{\gamma \in \Delta} \max_{H \in \mathbb{R}^{n \times k}} Tr\left(H^T \sum_{i=1}^{n} \left(A^{(i)} K_\gamma A^{(i)}\right) H\right)$$

$$\text{s.t.}$$

$$H^T H = I_k,$$

$$\text{wherein}$$

$$\Delta = \left\{\gamma \in \mathbb{R}^m \;\middle|\; \sum_{p=1}^{m} \gamma_p = 1,\ \gamma_p \ge 0,\ \forall\ p\right\},$$

$R^m$ represents . . . ; γp represents . . . ;

$$K_\gamma = \sum_{p=1}^{m} \gamma_p^2 K_p, \text{ and } A^{(i)} = S^{(i)} S^{(i)^T}$$

represents the nearest neighbor mask matrix.

In S5, the reduced gradient descent method is used to solve the minimum of the constructed objective function to obtain the optimal clustering partition matrix.

(1) The objective function of the simple multiple kernel k-means clustering SimpleMKKM is a special case of the localized simple multiple kernel k-means clustering objective function described above, then:

$$\sum_{i=1}^{n} Tr\left(H^T\left(A^{(i)} K_\gamma A^{(i)}\right) H\right) = \sum_{i=1}^{n} \left\langle A^{(i)} \otimes K_\gamma,\ A^{(i)} \otimes \left(HH^T\right)\right\rangle_F = \sum_{i=1}^{n} \left\langle A^{(i)} \otimes K_\gamma,\ HH^T\right\rangle_F = \left\langle \left(\sum_{i=1}^{n} A^{(i)}\right) \otimes K_\gamma,\ HH^T\right\rangle_F = \sum_{p=1}^{m} \gamma_p^2 \left\langle \left(\sum_{i=1}^{n} A^{(i)}\right) \otimes K_p,\ HH^T\right\rangle_F = \sum_{p=1}^{m} \gamma_p^2 \left\langle \tilde{K}_p,\ HH^T\right\rangle_F = Tr\left(H^T \tilde{K}_\gamma H\right),$$

wherein $\otimes$ represents the multiplication of elements;

$$\tilde{K}_p = \left(\sum_{i=1}^{n} A^{(i)}\right) \otimes K_p$$

represents a standardized kernel matrix;

when $$\tilde{K}_\gamma = \sum_{p=1}^{m} \gamma_p^2 \tilde{K}_p,$$

by applying such normalization to each basis kernel, it is clearly seen that global kernel alignment is a special case of the local kernel alignment criteria. As can be seen from the above, the aforementioned formula is simplified to SimpleMKKM when all elements of $A^{(i)}$ are set to 1. In this case, each sample takes the remaining samples as its neighbors. This means that SimpleMKKM may be taken as a special case of the above formula, and therefore, the above formula can be written equally effectively as:

$$\min_{\gamma \in \Delta} \mathcal{J}(\gamma)$$

wherein $$\mathcal{J}(\gamma) = \left\{ \max_{H} Tr\left(H^T \tilde{K}_\gamma H\right), \text{ s.t. } H^T H = I_k. \right\},$$

in this case, the min-max optimization is transformed into a min optimization, where its target $\mathcal{J}(\gamma)$ is a kernel k-means optimum function.

(2) Through the above normalization, each $\overline{K}_p$ still remains positive semi-definite (PSD).

This is specified with each $\overline{K}_p$ being a positive semi-definite matrix.

Note that $S^{(i)} \in \{0, 1\}^{n \times round(\tau \times n)}$ and $A^{(i)} = S^{(i)} S^{(i)^T}$, $A^{(i)}$ is a positive semi-definite matrix. Moreover, the product on the elements between two positive semi-definite matrices is still a positive semi-definite matrix. Therefore, each $\tilde{K}_p$ is a positive semi-definite matrix.

Every $\tilde{K}_p$ remains positive semi-definite through the above normalization, which guarantees the differentiability of $\mathcal{J}(\gamma)$. The differentiability of $\mathcal{J}(\gamma)$ is demonstrated next below, showing how its gradient is calculated and optimized using a reduced gradient descent algorithm.

(3) $\mathcal{J}(\gamma)$ is differentiable, and the global uniqueness of $\mathcal{J}(\gamma)$ can be derived.

The objective function is calculated by the gradient descent method as:

$$[\nabla \mathcal{J}(\gamma)]_p = \frac{\partial \mathcal{J}(\gamma)}{\partial \gamma_p} - \frac{\partial \mathcal{J}(\gamma)}{\partial \gamma_u} \; \forall \; p \neq u$$

$$[\nabla \mathcal{J}(\gamma)]_u = \sum_{p=1, p \neq u}^{m} \left( \frac{\partial \mathcal{J}(\gamma)}{\partial \gamma_u} - \frac{\partial \mathcal{J}(\gamma)}{\partial \gamma_p} \right)$$

wherein $$\frac{\partial \mathcal{J}(\gamma)}{\partial \gamma_p} = 2\gamma_p Tr\left(H^{*\top} \tilde{K}_p H^*\right),$$

$$H^* = \left\{ \arg\max_H Tr\left(H^{\top} \tilde{K}_\gamma H\right) \text{ s.t. } H^{\top} H = I_k \right\};$$

u is set as a number indicating the largest component of vector $\gamma$, which is believed to provide better numerical stability.

The embodiment considers a positive constraint of $\gamma$ in a descending direction, which is expressed as:

$$d_p = \begin{cases} 0 & \text{if } \gamma_p = 0 \text{ and } [\nabla \mathcal{J}(\gamma)]_p > 0 \\ -[\nabla \mathcal{J}(\gamma)]_p & \text{if } \gamma_p > 0 \text{ and } p \neq u \\ -[\nabla \mathcal{J}(\gamma)]_u & \text{if } p = u. \end{cases}$$

wherein $d_p$ represents the descending direction, and $\gamma$ can be calculated by $\gamma \leftarrow +ad$, where $\alpha$ is the optimal step length. It may be selected by a one-dimensional line search strategy, such as an Armijo criterion.

The embodiment discusses the computational complexity of the provided localized simple MKKM. In each iteration, the localized SimpleMKKM needs to solve a kernel k-means problem, calculate the descending direction, and search for the optimal step length. Therefore, its computational complexity at each iteration is $O(n^3+m*n^3+m*n_0)$, where $n_0$ is the maximum operand required to find the optimal step length. As observed, the localized simple MKKM does not significantly increase the computational complexity of existing MKKM and SimpleMKKM algorithms.

The convergence of the localized SimpleMKKM is then briefly discussed. Note that with a given $\gamma$, it becomes a traditional kernel k-means, which has a global optimum. Under this condition, the gradient calculation in step (3) is precise, the algorithm of the embodiment performs reduced gradient descent on a domain, and the function converges to the minimum of $\mathcal{J}(\gamma)$.

FIG. 2 shows a flowchart of an algorithm.

The embodiment provides a novel localized simple multiple kernel k-means clustering machine learning method, which includes modules of localized kernel alignment, objective function optimization to obtain an optimal combination coefficient $\gamma$, a corresponding partition matrix H, and the like. In the embodiment, through the optimization of the objective function, the optimized kernel combination can represent the information of a single view, and can better serve the view fusion, so that the purpose of improving the clustering effect is achieved. Moreover, the embodiment performs localization processing on each view to strengthen local information. MKKM-MM was the first attempt to improve MKKM through min-max learning, which indeed improves MKKM, but has a limited effect. The performance of the provided localized SimpleMKKM significantly surpasses that of MKKM-MM. This once again proves the advantages of the formula and the associated optimization strategy of the embodiment. The localized SimpleMKKM consistently and significantly outperforms SimpleMKKM.

Correspondingly, further provided is a face image clustering system based on localized simple multiple kernel k-means, including:

- an acquisition module, configured for acquiring face images and preprocessing the acquired face images to obtain an average kernel matrix for each view;
- a first calculation module, configured for calculating n $(\tau \times n)$-nearest neighbor matrices according to the obtained average kernel matrices;
- a second calculation module, configured for calculating a localized kernel matrix for each view according to the nearest neighbor matrices;
- a construction module, configured for constructing a localized simple multiple kernel k-means clustering objective function according to the calculated localized kernel matrix for each view;
- a solving module, configured for solving a minimum of the constructed objective function by adopting a reduced gradient descent method to obtain an optimal clustering partition matrix; and
- a clustering module, configured for performing k-means clustering on the obtained clustering partition matrix to achieve clustering.

Further, calculating the localized kernel matrix for each view in the second calculation module is expressed as:

$$\bar{K}_p = \left( \sum_{i=1}^{n} A^{(i)} \right) \otimes K_p$$

wherein $\overline{K}_p$ represents the localized kernel matrix of each view; $A^{(i)}$ represents the n ($\tau$×n)-nearest neighbor matrices; $K_p$ represents the p-th given kernel matrix; n represents a number of samples; ⊗ represents the multiplication of elements.

Further, the simple multiple kernel k-means clustering objective function in the construction module is expressed as:

$$\min_{\gamma\in\Delta}\max_{H\in\mathbb{R}^{n\times k}} Tr(K_\gamma H H^\top)$$

$$\text{s.t. } H^\top H = I_k.$$

wherein $\gamma$ represents a coefficient vector; H represents a partition matrix; $H^T$ represents a permutation of a commutation matrix; $K_\gamma$ represents a combined kernel matrix of $K_p$ generated by $\gamma$; $I_k$ represents a k-order identity matrix.

Further, the localized simple multiple kernel k-means clustering objective function in the construction module is expressed as:

$$\min_{\gamma\in\Delta}\max_{H\in\mathbb{R}^{n\times k}} TR\left(H^\top \sum_{i=1}^{n}\left(A^{(i)} K_\gamma A^{(i)}\right) H\right)$$

$$\text{s.t. } H^\top H = I_k,$$

wherein $$\Delta = \left\{\gamma \in \mathbb{R}^m \,\middle|\, \sum_{p=1}^{m} \gamma_p = 1,\ \gamma_p \ge 0,\ \forall\, p\right\},$$

$R^m$ represents an m-dimensional real number vector space; $\gamma_p$ represents the p-th component of $\gamma$.

Embodiment II

The difference between the face image clustering method based on localized simple multiple kernel k-means provided in the embodiment and that provided in Embodiment I is as follows: The embodiment tested the clustering performance of the present method on 8 MKKM benchmark datasets, including MSRA, Still, Cal-7, PFold, Nonpl, Flo17, Flo102, and Reuters. See table 1 for relevant information on the datasets.

TABLE 1

| Datasets Used | | | |
|---|---|---|---|
| Dataset | Samples | Kernels | Clusters |
| MSRA | 210 | 6 | 7 |
| Still | 467 | 3 | 6 |
| Cal-7 | 441 | 6 | 7 |
| PFD | 694 | 12 | 27 |
| Nonpl | 2732 | 69 | 3 |
| Flo17 | 1360 | 7 | 17 |
| Flo102 | 8189 | 4 | 102 |
| Reuters | 18758 | 5 | 6 |

The embodiment adopted an average multiple kernel k-means (A-MKKM) clustering algorithm, multiple kernel k-means (MKKM) clustering, localized multiple kernel k-means (LMKKM) clustering, robust multiple kernel k-means clustering (MKKM-MM), multiple kernel k-means clustering with matrix-induced regularization (MKKM-MR), optimal neighborhood multiple kernel clustering (ONKC), multi-view clustering via late fusion alignment maximization (MVC-LFA), and multiple kernel clustering with local alignment maximization (LKAM). In all experiments, all benchmark kernels were first centered and regularized. For all datasets, the number of categories was assumed to be known and set as the number of clustering categories. In addition, in the embodiment, grid search was used for the parameters of RMKKM, MKKM-MR, ONKC, and MVC-LFA.

The embodiment used common cluster accuracy (ACC), normalized mutual information (NMI), and Rand index (RI) to show the clustering performance of each method. All methods were randomly initialized and repeated 50 times and showed the best results to reduce the randomness caused by k-means.

TABLE 2

| Clustering Effect of Different Algorithms on Eight Datasets | | | | | | | | | | |
|---|---|---|---|---|---|---|---|---|---|---|
| DATASETS | AVG-KKM | MKKM [4] | LMKKM [2] | ONKC [13] | MKKM-MIR [12] | LKAM [9] | LF-MVC [23] | MKKM-MM [1] | SIMPLEMKKM [33] | PRO-POSED |
| ACC | | | | | | | | | | |
| MSRA | 83.3 ± 0.8 | 81.3 ± 3.1 | 81.9 ± 0.7 | 77.4 ± 1.6 | 87.9 ± 0.6 | 72.5 ± 0.5 | 84.2 ± 0.5 | 83.3 ± 0.8 | 86.5 ± 0.2 | 91.2 ± 0.3 |
| STILL | 31.3 ± 0.7 | 31.3 ± 0.6 | 31.1 ± 0.5 | 31.2 ± 1.3 | 31.5 ± 1.0 | 31.6 ± 0.2 | 31.7 ± 0.4 | 31.3 ± 0.7 | 31.3 ± 0.6 | 36.5 ± 0.7 |
| CAL-7 | 59.2 ± 4.9 | 52.2 ± 4.3 | 53.9 ± 1.0 | 60.2 ± 1.6 | 68.3 ± 0.0 | 63.9 ± 3.1 | 65.2 ± 7.1 | 59.2 ± 4.9 | 68.3 ± 1.5 | 76.5 ± 1.8 |
| PFD | 29.0 ± 1.5 | 27.0 ± 1.1 | 22.4 ± 0.7 | 35.3 ± 1.3 | 34.3 ± 1.7 | 31.7 ± 2.1 | 32.6 ± 1.9 | 29.0 ± 1.5 | 34.7 ± 1.9 | 35.9 ± 1.3 |
| NONPL | 49.7 ± 0.2 | 49.3 ± 0.2 | — | 49.9 ± 0.0 | 50.3 ± 0.2 | 53.8 ± 0.0 | 46.7 ± 0.6 | 49.7 ± 0.2 | 52.0 ± 0.0 | 69.3 ± 0.2 |
| FLO17 | 50.8 ± 1.5 | 44.9 ± 2.4 | 37.5 ± 1.6 | 42.9 ± 2.1 | 57.7 ± 1.2 | 39.6 ± 1.6 | 54.3 ± 1.8 | 50.8 ± 1.5 | 59.5 ± 1.3 | 61.3 ± 1.4 |
| FLO102 | 27.1 ± 0.8 | 22.4 ± 0.5 | — | 39.2 ± 0.9 | 39.1 ± 1.3 | 40.0 ± 1.0 | 43.2 ± 1.3 | 27.1 ± 0.8 | 42.5 ± 0.8 | 44.0 ± 1.0 |
| REUTERS | 45.5 ± 1.5 | 45.4 ± 1.5 | — | 40.9 ± 2.1 | 39.7 ± 1.5 | 40.0 ± 2.2 | 45.4 ± 1.7 | 45.5 ± 1.5 | 45.5 ± 0.7 | 46.6 ± 0.6 |
| NMI | | | | | | | | | | |
| MSRA | 74.0 ± 1.0 | 73.2 ± 1.7 | 75.0 ± 1.4 | 62.4 ± 2.2 | 77.3 ± 1.1 | 62.7 ± 0.9 | 73.2 ± 0.3 | 74.0 ± 1.0 | 75.2 ± 0.5 | 82.6 ± 0.5 |
| STILL | 12.8 ± 0.8 | 13.0 ± 0.8 | 13.2 ± 0.5 | 12.7 ± 0.4 | 12.9 ± 0.3 | 13.6 ± 0.2 | 11.4 ± 0.3 | 12.8 ± 0.8 | 12.8 ± 1.0 | 14.2 ± 0.3 |
| CAL-7 | 59.1 ± 2.9 | 51.6 ± 4.1 | 52.1 ± 1.3 | 53.7 ± 1.5 | 63.8 ± 0.0 | 59.2 ± 1.5 | 65.1 ± 2.6 | 59.1 ± 2.9 | 63.7 ± 0.3 | 74.6 ± 1.2 |
| PFD | 40.3 ± 1.3 | 38.0 ± 0.6 | 34.7 ± 0.6 | 44.0 ± 0.8 | 43.1 ± 1.0 | 42.5 ± 1.2 | 41.7 ± 1.1 | 40.3 ± 1.3 | 44.4 ± 1.1 | 45.2 ± 0.9 |
| NONPL | 17.2 ± 0.5 | 15.0 ± 0.5 | — | 14.4 ± 0.0 | 14.9 ± 0.0 | 0.2 ± 0.0 | 9.8 ± 0.2 | 17.2 ± 0.5 | 11.2 ± 0.0 | 22.6 ± 0.1 |
| FLO17 | 49.7 ± 1.0 | 44.9 ± 1.5 | 38.8 ± 1.1 | 43.0 ± 1.4 | 57.2 ± 0.8 | 42.4 ± 0.8 | 54.1 ± 0.9 | 49.7 ± 1.0 | 57.8 ± 0.9 | 39.4 ± 0.7 |
| FLO102 | 46.0 ± 0.5 | 42.7 ± 0.2 | — | 55.7 ± 0.4 | 55.9 ± 0.6 | 55.4 ± 0.4 | 57.8 ± 0.6 | 46.0 ± 0.5 | 58.6 ± 0.5 | 60.0 ± 0.4 |
| REUTERS | 27.4 ± 0.4 | 27.3 ± 0.4 | — | 21.0 ± 1.8 | 21.3 ± 1.3 | 21.5 ± 2.3 | 27.2 ± 0.2 | 27.4 ± 0.4 | 27.7 ± 0.2 | 28.3 ± 0.6 |

TABLE 2-continued

Clustering Effect of Different Algorithms on Eight Datasets

| DATASETS | AVG-KKM | MKKM [4] | LMKKM [2] | ONKC [13] | MKKM-MIR [12] | LKAM [9] | LF-MVC [23] | MKKM-MM [1] | SIMPLEMKKM [33] | PRO-POSED |
|---|---|---|---|---|---|---|---|---|---|---|
| PURITY | | | | | | | | | | |
| MSRA | 83.3 ± 0.8 | 81.5 ± 2.7 | 81.9 ± 0.7 | 77.4 ± 1.6 | 87.9 ± 0.6 | 72.5 ± 0.5 | 84.2 ± 0.5 | 83.3 ± 0.8 | 36.5 ± 0.2 | 91.2 ± 0.3 |
| STILL | 33.8 ± 0.8 | 33.8 ± 0.7 | 33.3 ± 0.5 | 33.9 ± 0.9 | 34.0 ± 0.8 | 35.7 ± 0.3 | 34.8 ± 0.4 | 33.8 ± 0.8 | 33.8 ± 0.7 | 38.2 ± 0.6 |
| CAL-7 | 68.0 ± 3.2 | 63.8 ± 3.7 | 66.4 ± 0.6 | 67.1 ± 1.3 | 72.1 ± 0.0 | 70.7 ± 2.0 | 76.7 ± 3.2 | 68.0 ± 3.2 | 72.3 ± 0.2 | 82.3 ± 1.4 |
| PFD | 37.4 ± 1.7 | 33.7 ± 1.1 | 31.2 ± 1.0 | 41.9 ± 1.0 | 41.2 ± 1.4 | 39.6 ± 1.5 | 39.2 ± 1.4 | 37.4 ± 1.7 | 41.8 ± 1.5 | 42.5 ± 1.3 |
| NONPL | 72.5 ± 0.2 | 71.2 ± 0.2 | — | 60.4 ± 0.0 | 60.4 ± 0.0 | 60.4 ± 0.0 | 66.5 ± 0.2 | 72.3 ± 0.2 | 60.4 ± 0.0 | 71.6 ± 0.2 |
| FLO17 | 51.9 ± 1.5 | 46.2 ± 2.0 | 39.2 ± 1.3 | 44.7 ± 2.0 | 39.2 ± 1.2 | 42.8 ± 1.2 | 55.6 ± 1.5 | 51.9 ± 1.5 | 60.9 ± 1.2 | 62.4 ± 1.3 |
| FLO102 | 32.3 ± 0.6 | 27.8 ± 0.4 | — | 45.1 ± 0.9 | 45.2 ± 1.0 | 46.5 ± 0.6 | 49.7 ± 1.0 | 32.3 ± 0.6 | 48.6 ± 0.7 | 50.3 ± 0.8 |
| REUTERS | 53.0 ± 0.4 | 52.9 ± 0.5 | — | 51.8 ± 1.5 | 50.9 ± 1.4 | 51.9 ± 1.0 | 52.9 ± 0.3 | 53.0 ± 0.4 | 53.3 ± 0.0 | 53.4 ± 0.4 |
| RAND INDEX | | | | | | | | | | |
| MSRA | 68.1 ± 1.0 | 66.2 ± 3.1 | 68.0 ± 1.1 | 55.7 ± 2.6 | 74.4 ± 1.2 | 53.8 ± 0.7 | 68.4 ± 0.6 | 68.1 ± 1.0 | 71.2 ± 0.5 | 80.6 ± 0.5 |
| STILL | 8.0 ± 0.5 | 8.0 ± 0.5 | 8.0 ± 0.2 | 7.8 ± 0.3 | 8.1 ± 0.2 | 8.2 ± 0.1 | 7.1 ± 0.2 | 8.0 ± 0.5 | 7.9 ± 0.5 | 9.3 ± 0.3 |
| CAL-7 | 46.0 ± 6.5 | 38.3 ± 4.9 | 41.2 ± 1.1 | 43.0 ± 2.1 | 54.9 ± 0.0 | 50.6 ± 3.1 | 55.8 ± 6.8 | 46.0 ± 6.5 | 55.6 ± 0.3 | 69.9 ± 1.8 |
| PFD | 14.4 ± 1.8 | 12.1 ± 0.7 | 7.8 ± 0.4 | 17.6 ± 1.3 | 17.4 ± 1.6 | 15.5 ± 1.5 | 15.8 ± 1.6 | 14.4 ± 1.8 | 17.6 ± 1.9 | 19.8 ± 1.0 |
| NONPL | 17.6 ± 0.3 | 13.8 ± 0.4 | — | 8.3 ± 0.0 | 8.5 ± 0.1 | 11.3 ± 0.0 | 10.7 ± 0.2 | 17.6 ± 0.3 | 8.0 ± 0.0 | 35.0 ± 0.1 |
| FLO17 | 32.2 ± 1.3 | 27.2 ± 1.8 | 20.6 ± 1.1 | 24.3 ± 1.5 | 40.1 ± 0.9 | 22.6 ± 0.9 | 37.4 ± 1.3 | 32.2 ± 1.3 | 41.5 ± 1.5 | 43.4 ± 1.0 |
| FLO102 | 15.5 ± 0.3 | 12.1 ± 0.4 | — | 24.5 ± 0.6 | 24.9 ± 1.1 | 26.0 ± 0.8 | 29.7 ± 1.1 | 15.5 ± 0.5 | 28.3 ± 0.8 | 29.9 ± 0.8 |
| REUTERS | 21.8 ± 1.4 | 21.8 ± 1.4 | — | 18.8 ± 2.4 | 18.9 ± 2.0 | 16.9 ± 2.7 | 21.4 ± 1.1 | 21.8 ± 1.4 | 22.1 ± 0.8 | 22.0 ± 0.3 |

Table 2 shows the clustering effects of the above methods and the comparison algorithms on all datasets. From this table, it can be observed that: 1. MKKM-MM was the first attempt to improve MKKM through min-max learning. As observed, it does improve MKKM, but the performance improvement over MKKM is limited across all datasets. Meanwhile, the performance of the provided localized simple MKKM significantly surpasses that of MKKM-MM. This once again proves the advantages of the method and the associated optimization strategy of the embodiment. 2. In addition to the localized SimpleMKKM of the method, SimpleMKKM also achieves comparable or better clustering performance than the above algorithms on all benchmark datasets. The superiority is attributed to its new formula and new optimization algorithm. 3. The provided localized SimpleMKKM consistently and significantly outperforms SimpleMKKM. For example, ACC exceeds SimpleMKKM algorithm by 4.7%, 5.2%, 8.3%, 1.2%, 17.3%, 17.3%, 1.8%, 1.5%, and 1.1% on 8 benchmark datasets. Improvements in other criteria are also similar. These results well prove the superiority of the provided localized simple MKKM benefiting from exploring and extracting local information of the kernel matrix.

Figure 3:
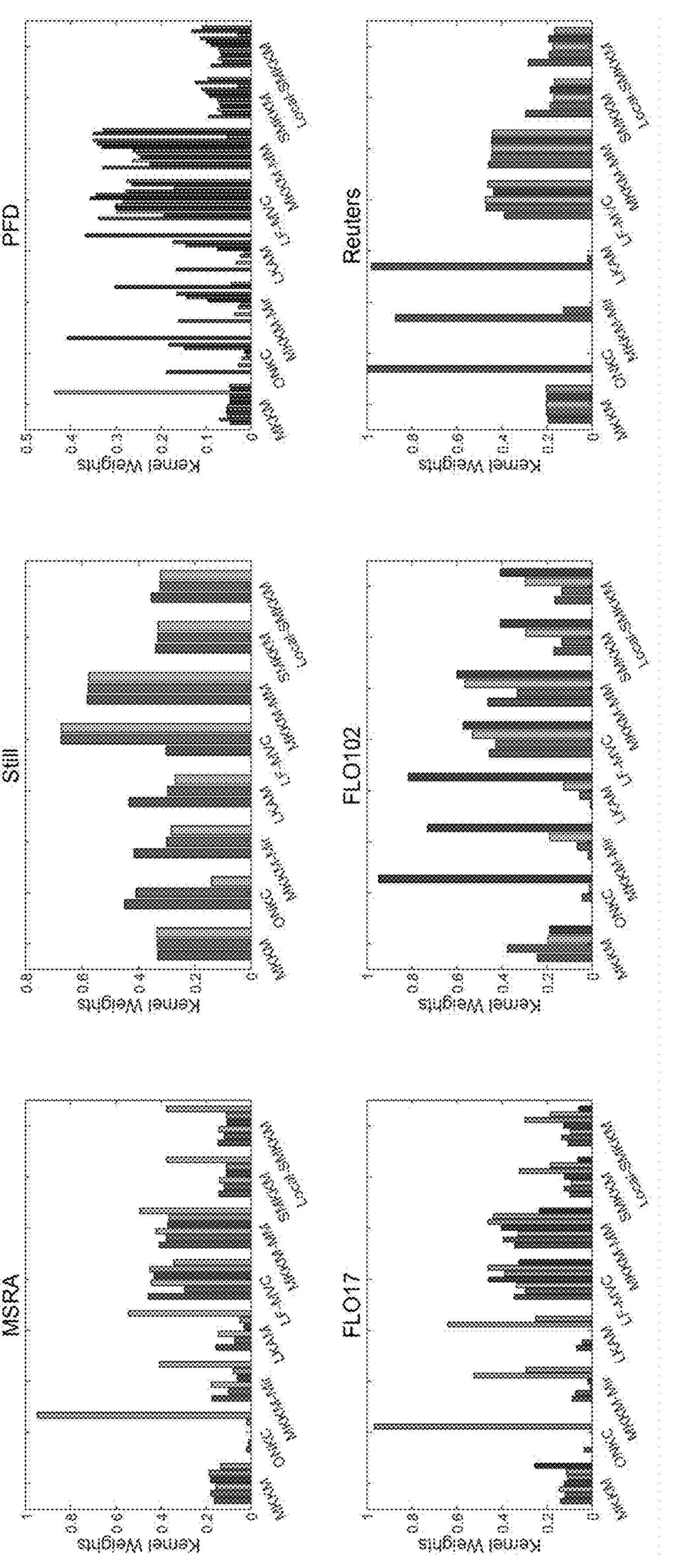
FIG. 3 is a schematic diagram of kernel coefficients learned by different algorithms according to Embodiment II.
Figure 4:
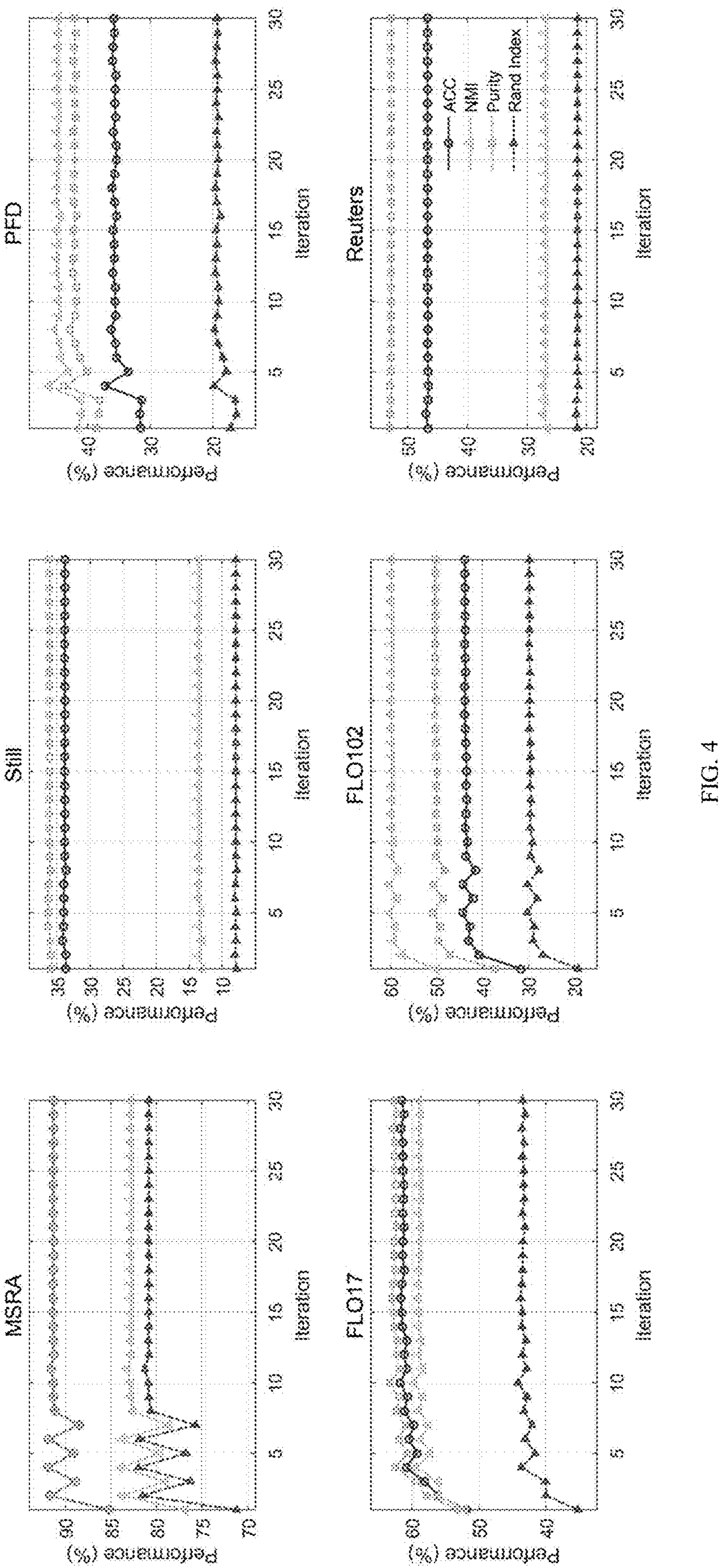
FIG. 4 is a schematic diagram illustrating the clustering performance of localized SimpleMKKM learning H over iterations on 6 benchmark datasets according to Embodiment II.
Figure 5:
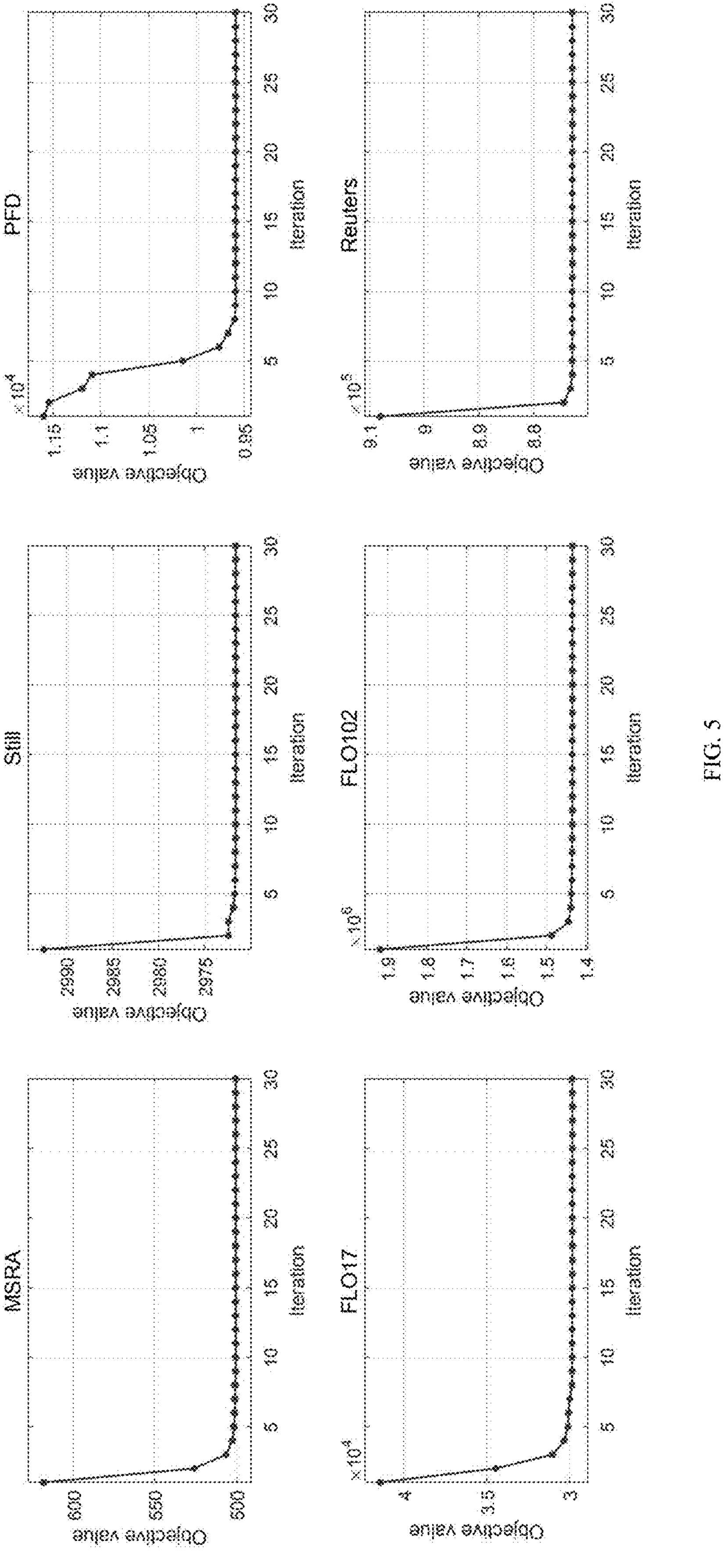
FIG. 5 is a schematic diagram illustrating the variation in the objective function value of localized SimpleMKKM with the number of iterations according to Embodiment II.
Figure 6:
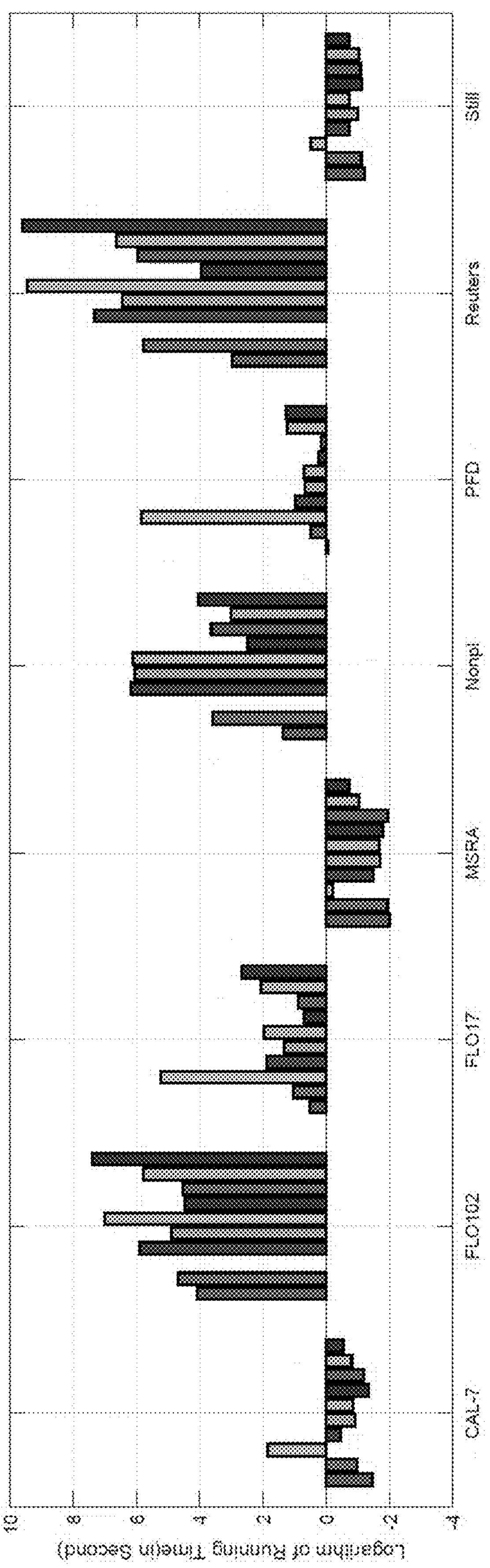
FIG. 6 is a schematic diagram comparing the running times of different algorithms on all benchmark datasets according to Embodiment II.
Figure 7:
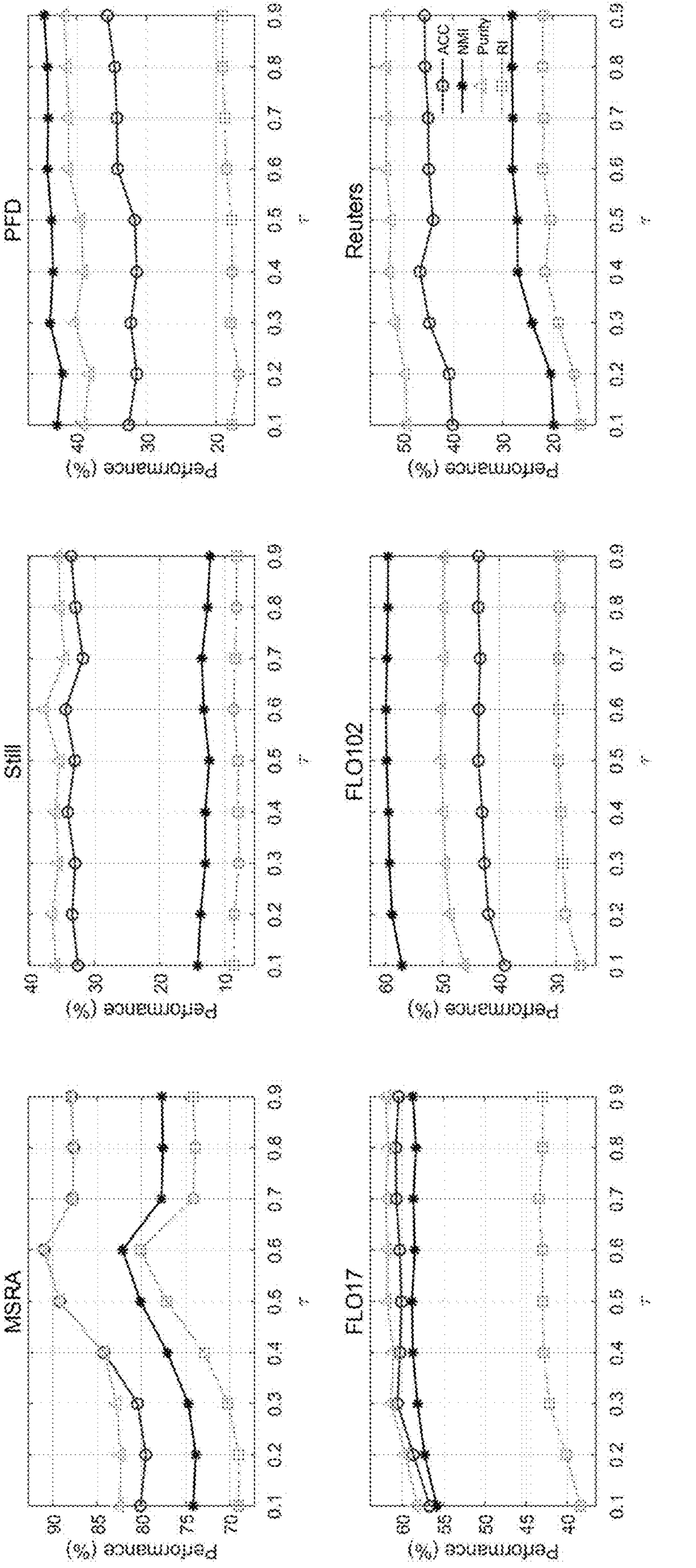
FIG. 7 is a schematic diagram illustrating the effect of the magnitude of the nearest neighbor ratio t on clustering performance on 6 representative datasets according to Embodiment II.

FIG. 3 shows kernel coefficients learned by different algorithms. FIG. 4 shows the clustering performance of localized SimpleMKKM learning H over iterations on 6 benchmark datasets. FIG. 5 shows the variation in the objective function value of localized SimpleMKKM with the number of iterations. FIG. 6 shows the comparison of the running times (unit: logarithm of seconds) of different algorithms on all benchmark datasets, where histograms under each dataset are, from left to right, Avg-KKM, MKKM, LMKKM, ONKC, MKKM-MiR, LKAM, LF-MVC, MKKM-MM, SimpleMKKM, and LSMKKM. FIG. 7 shows the effect of the magnitude of the nearest neighbor ratio $\tau$ on clustering performance on 6 representative datasets.

The embodiment provides a novel localized simple multiple kernel k-means clustering machine learning method, which includes modules of localized kernel alignment, objective function optimization to obtain an optimal combination coefficient $\gamma$, a corresponding partition matrix H, and the like. In the embodiment, through the optimization of the objective function, the optimized kernel combination can represent the information of a single view, and can better serve the view fusion, so that the purpose of improving the clustering effect is achieved. Moreover, the embodiment performs localization processing on each view to strengthen local information. MKKM-MM was the first attempt to improve MKKM through min-max learning, which indeed improves MKKM, but has a limited effect. The performance of the provided localized SimpleMKKM significantly surpasses that of MKKM-MM. This once again proves the advantages of the formula and the associated optimization strategy of the embodiment. The localized SimpleMKKM consistently and significantly outperforms SimpleMKKM.

It should be noted that the above descriptions are only preferred embodiments of the present application and the principles of the employed technologies. It should be understood by those skilled in the art that the present application is not limited to the particular embodiments described herein, and those skilled in the art can make various obvious changes, rearrangements, and substitutions without departing from the protection scope of the present application. Therefore, although the present application has been described in more detail by the above embodiments, it is not limited to the above embodiments, and may further include other equivalent embodiments without departing from the concept of the present application, and the scope of the present application is determined by the scope of the appended claims

What is claimed is:

1. A face image clustering method based on localized simple multiple kernel k-means, comprising the following steps:

S1, acquiring face images, and preprocessing the face images to obtain an average kernel matrix for each view;

S2, calculating n ($\tau \times n$)-nearest neighbor matrices according to the average kernel matrices;

S3, calculating a localized kernel matrix for each view according to the nearest neighbor matrices;

S4, constructing a localized simple multiple kernel k-means clustering objective function according to the localized kernel matrix for each view;

S5, solving a minimum of the localized simple multiple kernel k-means clustering objective function by adopting a reduced gradient descent method to obtain an optimal clustering partition matrix; and S6, performing k-means clustering on the optimal clustering partition matrix to achieve clustering.

2. The face image clustering method based on localized simple multiple kernel k-means according to claim 1, wherein calculating the localized kernel matrix of each view in S3 is expressed as:

$$\bar{K}_p = \left(\sum_{i=1}^{n} A^{(i)}\right) \otimes K_p$$

wherein $\bar{K}_p$ represents the localized kernel matrix of each view; $A^{(i)}$ represents the n (τ×n)-nearest neighbor matrices; $K_p$ represents a p-th given kernel matrix; n represents a number of samples; ⊗ represents a multiplication of elements.

3. The face image clustering method based on localized simple multiple kernel k-means according to claim 2, wherein the simple multiple kernel k-means clustering objective function in S4 is expressed as:

$$\min_{\gamma\in\Delta} \max_{H\in\mathbb{R}^{n\times k}} Tr(K_\gamma H H^{\top})$$
$$\text{s.t. } H^{\top} H = I_k.$$

wherein γ represents a coefficient vector; H represents a partition matrix; $H^T$ represents a permutation of a commutation matrix; $K_\gamma$ represents a combined kernel matrix of $K_p$ generated by γ; $I_k$ represents a k-order identity matrix.

4. The face image clustering method based on localized simple multiple kernel k-means according to claim 3, wherein the localized simple multiple kernel k-means clustering objective function in S4 is expressed as:

$$\min_{\gamma\in\Delta} \max_{H\in\mathbb{R}^{n\times k}} TR\left(H^{\top} \sum_{i=1}^{n} \left(A^{(i)} K_\gamma A^{(i)}\right) H\right)$$
$$\text{s.t. } H^{\top} H = I_k,$$

wherein $$\Delta = \left\{\gamma \in \mathbb{R}^m \,\middle|\, \sum_{p=1}^{m} \gamma_p = 1,\ \gamma_p \geq 0,\ \forall\, p\right\},$$

$R^m$ represents an m-dimensional real number vector space; $\gamma_p$ represents a p-th component of γ.

5. The face image clustering method based on localized simple multiple kernel k-means according to claim 4, wherein solving the minimum of the localized simple multiple kernel k-means clustering objective function in S5 comprises:

simplifying the localized simple multiple kernel k-means clustering objective function into a simple multiple kernel k-means clustering objective function:

$$
\begin{aligned}
\sum_{i=1}^{n} &= Tr\left(H^{\top} \left(A^{(i)} K_\gamma A^{(i)}\right) H\right) \\
&= \sum_{i=1}^{n} \left\langle A^{(i)} \otimes K_\gamma,\ A^{(i)} \otimes (H H^{\top})\right\rangle_F \\
&= \sum_{i=1}^{n} \left\langle A^{(i)} \otimes K_\gamma,\ H H^{\top}\right\rangle_F \\
&= \left\langle\left(\sum_{i=1}^{n} A^{(i)}\right) \otimes K_\gamma,\ H H^{\top}\right\rangle_F \\
&= \sum_{p=1}^{m} \gamma_p^2 \left\langle\left(\sum_{i=1}^{n} A^{(i)}\right) \otimes K_p,\ H H^{\top}\right\rangle_F \\
&= \sum_{p=1}^{m} \gamma_p^2 \left\langle \tilde{K}_p,\ H H^{\top}\right\rangle^F \\
&= Tr\left(H^{\top} \tilde{K}_\gamma H\right),
\end{aligned}
$$

wherein ⊗ represents the multiplication of elements;

$$\tilde{K}_p = \left(\sum_{i=1}^{n} A^{(i)}\right) \otimes K_p$$

represents a standardized kernel matrix;

when all elements of $A^{(i)}$ are set to 1, the simple multiple kernel k-means clustering objective function is expressed as:

$$\min_{\gamma\in\Delta} \mathcal{J}(\gamma)$$

wherein $$\mathcal{J}(\gamma) = \left\{\max_{H} Tr\left(H^{\top} \tilde{K}_\gamma H\right),\ \text{s.t. } H^{\top} H = I_k.\right\},$$

representing an optimum function.

6. The face image clustering method based on localized simple multiple kernel k-means according to claim 5, wherein solving the minimum of the localized simple multiple kernel k-means clustering objective function by adopting the reduced gradient descent method in S5 comprises:

calculating the localized simple multiple kernel k-means clustering objective function by the reduced gradient descent method as:

$$[\nabla \mathcal{J}(\gamma)]_p = \frac{\partial \mathcal{J}(\gamma)}{\partial \gamma_p} - \frac{\partial \mathcal{J}(\gamma)}{\partial \gamma_u}\ \forall\, p \neq u$$

$$[\nabla \mathcal{J}(\gamma)]_u = \sum_{p=1, p\neq u}^{m} \left(\frac{\partial \mathcal{J}(\gamma)}{\partial \gamma_u} - \frac{\partial \mathcal{J}(\gamma)}{\partial \gamma_p}\right)$$

wherein $$\frac{\partial \mathcal{J}(\gamma)}{\partial \gamma_p} = 2\gamma_p Tr\left(H^{*\top} \tilde{K}_p H^*\right)$$

$$H^* = \left\{\arg\max_H Tr\left(H^{\top} \tilde{K}_\gamma H\right)\ \text{s.t. } H^{\top} H = I_k\right\};$$

u is set as a number indicating a largest component of vector γ, and a positive constraint of γ is expressed as:

$$
d_p = \begin{cases} 0 & \text{if } \gamma_p = 0 \text{ and } [\nabla \mathcal{J}(\gamma)]_p > 0 \\ -[\nabla \mathcal{J}(\gamma)]_p & \text{if } \gamma_p = 0 \text{ and } p \neq u \\ -[\nabla \mathcal{J}(\gamma)]_u & \text{if } p = u. \end{cases}
$$

wherein $d_p$ represents a descending direction.

* * * * *